US008038351B2

(12) United States Patent
Arnold et al.

(10) Patent No.: US 8,038,351 B2
(45) Date of Patent: Oct. 18, 2011

(54) SELF-LUBRICATED BEARING ASSEMBLY

(75) Inventors: Robert Arnold, Port Ludlow, WA (US); Phillip Beausoleil, Harleysville, PA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 841 days.

(21) Appl. No.: 12/056,538

(22) Filed: Mar. 27, 2008

(65) Prior Publication Data

US 2008/0235906 A1 Oct. 2, 2008

Related U.S. Application Data

(60) Provisional application No. 60/921,124, filed on Mar. 30, 2007.

(51) Int. Cl.
*F16C 33/02* (2006.01)
*F16C 33/20* (2006.01)

(52) U.S. Cl. .......................... 384/276; 384/152; 384/300

(58) Field of Classification Search .......... 384/151–153, 384/275, 276, 279, 280, 286–290, 294, 297–300, 384/912

See application file for complete search history.

(56) References Cited

U.S. PATENT DOCUMENTS 3,328,041 A * 6/1967 Bloom et al. ................ 277/468
3,594,049 A 7/1971 Turner
4,422,288 A * 12/1983 Steber ............................ 60/800
4,477,197 A 10/1984 Choate
4,717,268 A 1/1988 Orkin
5,219,232 A * 6/1993 Adams et al. ................ 384/275
5,398,294 A * 3/1995 Narkon ........................ 384/280
5,885,006 A * 3/1999 Sheedy ........................ 384/192

FOREIGN PATENT DOCUMENTS

EP 1752670 A 2/2007
FR 2175318 A 10/1973

OTHER PUBLICATIONS

English translation of French Patent No. 7208268, same as FR 2175318, translation dated Oct. 28, 2008.
Search report dated Aug. 19, 2008.

* cited by examiner

*Primary Examiner* — James Pilkington

(74) *Attorney, Agent, or Firm* — Michaud-Kinney Group LLP

(57) ABSTRACT

A self-lubricating bearing assembly for a hinge of a turbine engine nozzle is described. The hinge includes a bolt and a bell crank housing. The bearing assembly includes a sleeve, a pair of bushings, liners, a thrust washer and a nut. The sleeve includes a tubular and a shoulder portion. Each bushing has an inner and an outer diameter. The liners include first liners, each bonded to the inner diameter of a respective one of the bushings, a second liner disposed between the shoulder portion and a bushing, and a third liner disposed between the thrust washer and a bushing. When assembled, the tubular portion is disposed over an outer diameter of the bolt, the outer diameters of the bushings are disposed within an inner diameter of the bell crank housing, and the nut is affixed between the thrust washer and the bolt to secure the hinge assembly.

7 Claims, 3 Drawing Sheets

10
12
130
120
110
112
40
150
160
22
20
170
180
136
140
114
134
200
146
210
144

SELF-LUBRICATED BEARING ASSEMBLY

CROSS-REFERENCE TO RELATED APPLICATIONS

This patent application claims the benefit of U.S. Provisional Patent Application Ser. No. 60/921,124, entitled "SELF-LUBRICATED BEARING ASSEMBLY," that was filed on Mar. 30, 2007. The disclosure of this U.S. patent document is incorporated by reference in its entirety as if fully set forth herein.

BACKGROUND OF THE INVENTION

1. Field of the Invention

This invention relates to a hinge assembly of a turbine engine nozzle assembly and, more particularly, to a bell crank mechanism of a turbine engine nozzle assembly employing a novel self-lubricated bearing assembly.

2. Description of the Related Art

As is generally known in the art, turbine engine nozzle assemblies typically include a rod or bolt attached to a flap by means of, for example, at least one hinge assembly such as, for example, a bell crank linkage assembly. The bell crank assembly translates horizontal movement into vertical movement or, vise versa, for actuating the flap. Conventional bell crank assemblies include ball bearings between a housing of the bell crank assembly and the bolt to reduce friction, minimize wear and improve performance. High temperature and high frequency vibration within the operating environment of the turbine engine nozzles has a significant impact on the performance and life cycle of components of conventional bell crank assemblies. For example, the ball bearings generally can not be sufficiently lubricated within the operating environment of the turbine engine nozzle. Therefore, the ball bearings require frequent maintenance and replacement resulting in high operating costs.

FIG. 1 illustrates a portion of a conventional turbine engine nozzle assembly including a bell crank linkage assembly, shown generally at 10, affixed about a threaded stud or bolt 20. As is generally known in the art, the bolt 20 is attached to a flap (not shown). As shown in FIG. 1, the bell crank assembly 10 is retained about the bolt 20 by a locking tab washer 30 and a nut 40. Two ball bearings 50 and 60 are installed within the bell crank assembly 10 such that outer races 52 and 62 of the ball bearings 50 and 60, respectively, contact an inner diameter 12 of the bell crank assembly 10 and inner races 54 and 64 of the ball bearings 50 and 60 contact an outer diameter 22 of the bolt 20. The ball bearings 50 and 60 are intended to reduce friction and minimize wear between the bell crank assembly 10 and the bolt 20. As noted above in the Background portion of this disclosure, the operating environment of the turbine engine nozzle assembly includes high temperatures and high frequency vibration. Additionally, in conventional designs, it is difficult to lubricate the ball bearings 50 and 60 once installed within the bell crank assembly 10. As a result, the ball bearings 50 and 60 require frequent maintenance and replacement leading to increased operational costs.

Accordingly, the inventors have realized that a need exists for an improved bell crank assembly having components that operate more efficiently within high temperature, high vibration environment of a turbine engine nozzle.

SUMMARY OF THE INVENTION

The present invention is directed to a self-lubricating bearing assembly of a hinge assembly of a turbine engine nozzle. The hinge assembly includes a bolt and a bell crank housing. The self-lubricating bearing assembly includes a sleeve, a plurality of bushings, a plurality of liners, a thrust washer and a nut. The sleeve includes a tubular portion and a shoulder portion. The plurality of bushings each include an inner diameter and an outer diameter. The plurality of liners include first liners, a second liner and a third liner. One of the first liners is affixed (e.g., bonded) to the inner diameter of a respective one of the plurality of bushings. The second liner is disposed between a surface of the shoulder portion of the sleeve and one of the plurality of bushings. The third liner is disposed between a surface of the thrust washer and one of the plurality of bushings. When assembled, the tubular portion of the sleeve is disposed over an outer diameter of the bolt, the outer diameters of the plurality of bushings are disposed within an inner diameter of the bell crank housing, and the nut is affixed between the thrust washer and the bolt to secure the hinge assembly.

In one embodiment, the first liners, the second liners and the third liner are comprised of a woven fluorocarbon-based polymer fabric material. In one embodiment, the woven fluorocarbon-based polymer fabric material is a PolyTetraFluoroEthylene (PTFE) fabric material.

BRIEF DESCRIPTION OF THE DRAWINGS

The features and advantages of the present invention will be better understood when the Detailed Description of the Preferred Embodiments given below is considered in conjunction with the figures provided.

In these figures like structures are assigned like reference numerals, but may not be referenced in the description of all figures.

DETAILED DESCRIPTION OF THE PREFERRED EMBODIMENTS

The following detailed description of the invention refers to the accompanying drawings. While the detailed description may refer to the invention used to improve a particular aspect of turbine engine nozzle design, assembly and maintenance, the detailed description is not intended to limit the scope of the present invention. Rather, the scope of the invention is defined by the appended claims and equivalents.

Figure 1:
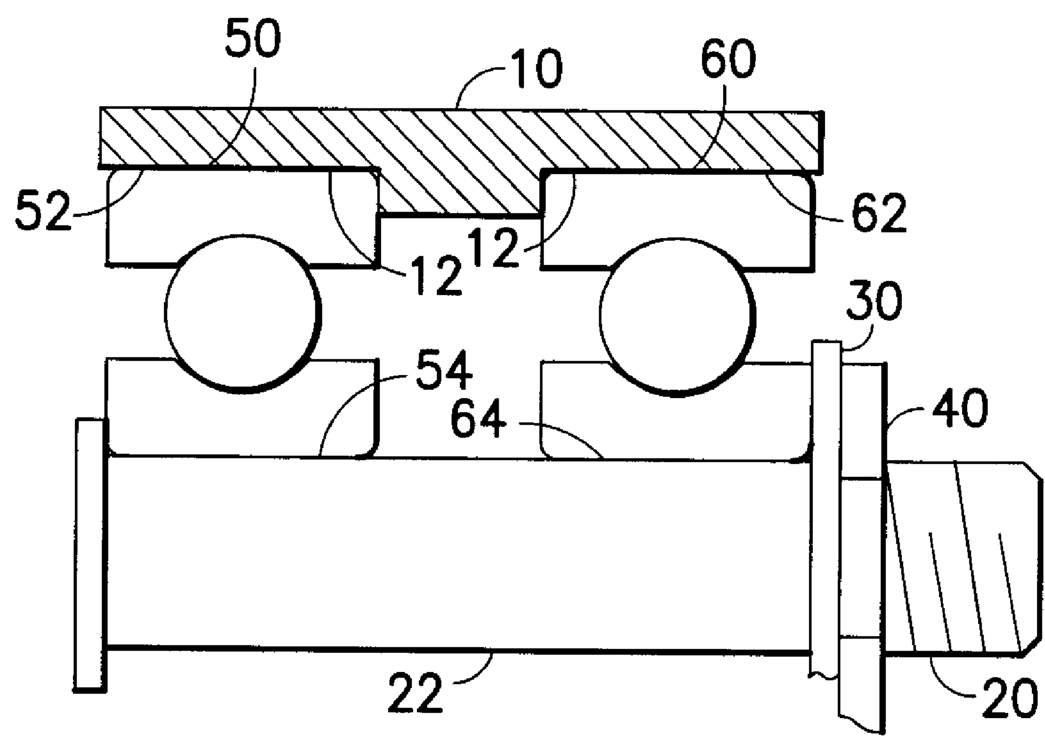
FIG. 1 is a cross-sectional view illustrating a portion of a conventional bell crank assembly affixed about a bolt within a turbine engine nozzle assembly, as is known in the art.
Figure 2:
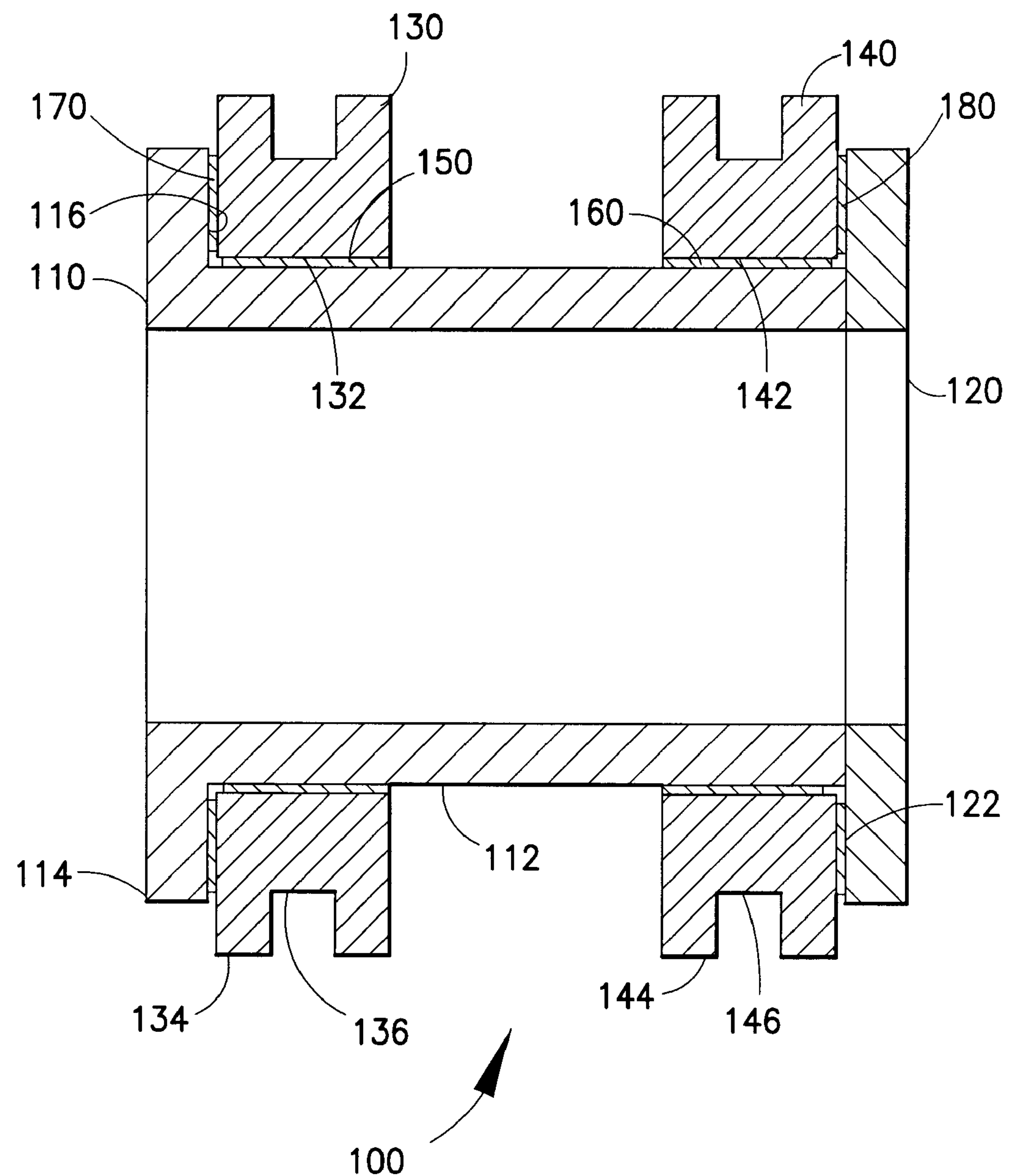
FIG. 2 is a cross-sectional view of a self-lubricating bearing assembly configured and operating in accordance with one embodiment of the present invention.

In accordance with the present invention, the inventors have discovered that when the ball bearing 50 and 60 are replaced with a self-lubricated bearing assembly improved reliability and performance is achieved without adversely affecting weight or cost. FIG. 2 is a cross-sectional view of a novel self-lubricating bearing assembly 100 configured and operating in accordance with one embodiment of the present invention. As shown in FIG. 2, the bearing assembly 100 includes a sleeve 110, a thrust washer 120, two bushings 130 and 140 and self-lubricating bearing liners 150, 160, 170 and 180. The sleeve 110 has a tubular portion 112 and a shoulder portion 114. The bearing liners 150 and 160 are affixed (e.g., bonded) to inner diameters 132 and 142 of the bushings 130 and 140, respectively. The liner 170 is affixed (e.g., bonded)

to a surface 116 of the shoulder portion 114 of the sleeve 110 and the liner 180 is affixed (e.g., bonded) to a surface 122 of the thrust washer 120.

In one embodiment the liners 150, 160, 170 and 180 are comprised of a woven fluorocarbon-based polymer fabric material such as, for example, a PolyTetraFluoroEthylene (PTFE) fabric material. In one embodiment, the woven PTFE fabric material is commercially available under the designation FABROID® X (FABROID is a registered trademark of Roller Bearing Company of America, Oxford, Conn.). In accordance with the present invention, self-lubricated bearing liners 150, 160, 170 and 180 cooperate with hard, smooth surfaces of the sleeve 110, thrust washer 120 and bushings 130 and 140 to improve performance and wear life of the bearing assembly 100 and the bell crank assembly employing the bearing assembly 100.

Figure 3:
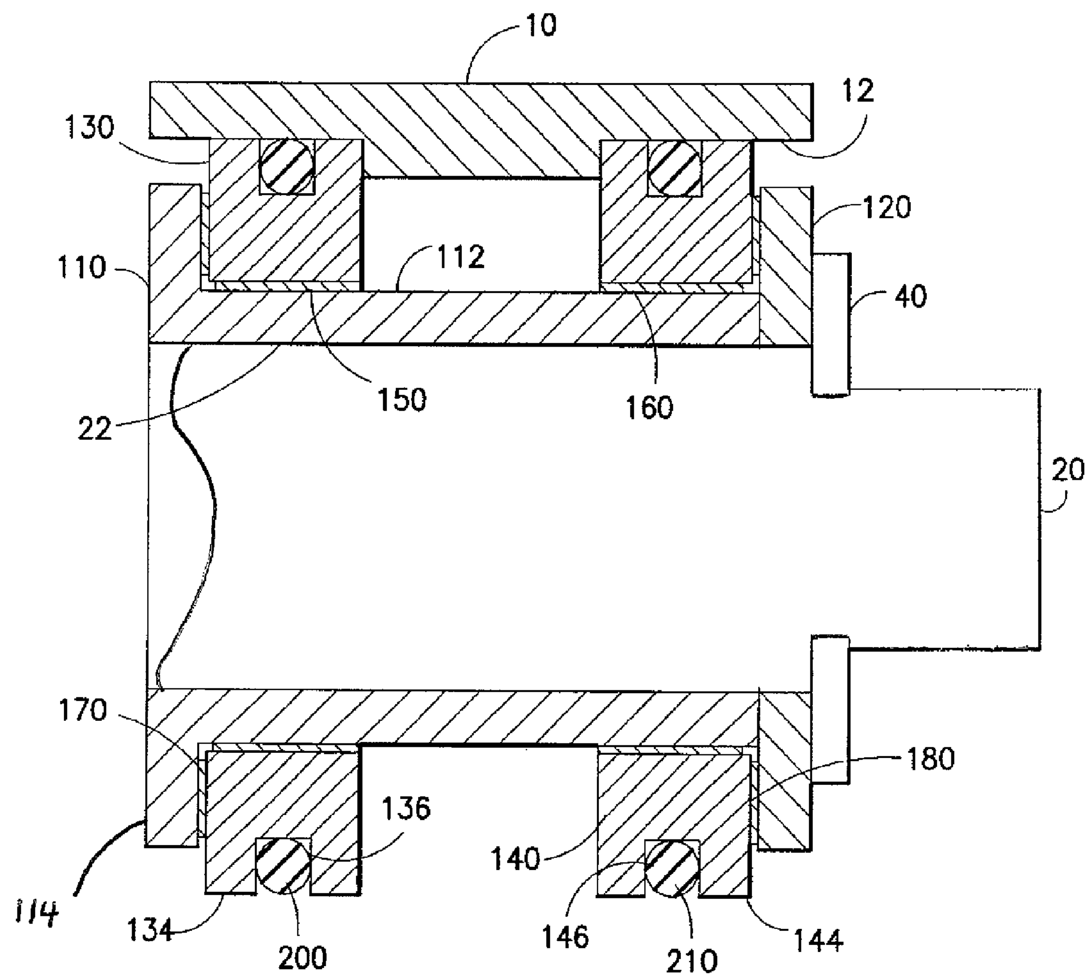
FIG. 3 is a cross-sectional view of the self-lubricating bearing assembly of FIG. 2 installed within a bell crank assembly showing a portion of a bolt.

As shown in FIG. 3, the sleeve 110 is fitted over the outer diameter 22 of the bolt 20. The bushings 130 and 140 replace the ball bearings 50 and 60 of the conventional bell crank assembly 10 and are disposed about an outer diameter 112 of the sleeve 110 such that the bearing liners 150 and 160 contact the sleeve 100. The thrust washer 120, nut 40 and bolt 20 secure the bushings 130 and 140 within the inner diameter 12 of the bell crank assembly 10. In one embodiment, seals or o-rings 200 and 210 are disposed in recesses 136 and 146 on an outer diameter 134 and 144 of the bushings 130 and 140, respectively. In one embodiment, the bolt 20 includes a flange (not shown) extending laterally from one end of the bolt for engagement with the shoulder portion 114 of the sleeve 110.

It should be appreciated that polymeric materials such as those employed within the liners 150, 160, 170 and 180 absorb the high frequency, low amplitude vibration inherent in gas turbine engine environments. Moreover, the self-lubricating liners 150, 160, 170 and 180 (comprised of, for example, the aforementioned FABROID® X material) have a relatively low modulus of elasticity along with a high molecular weight, thermoset, polyimide polymer such that the liners absorb vibration with relatively little wear while accommodating the high temperature typically present within the engine nozzle environment.

Accordingly, the integrated bearing assembly 100 of the present invention, including the sleeve 110, the thrust washer 120, the bushings 130 and 140 and the self-lubricating bearing liners 150, 160, 170 and 180 provide hard and smooth mating surfaces while maintaining a total weight that is equivalent to components of the conventional bell crank assembly 10 including ball bearings. Therefore, improved performance and reliability is achieved without sacrificing additional weight.

One or more embodiments of the present invention have been described. Nevertheless, it will be understood that various modifications may be made without departing from the spirit and scope of the invention. For example, many construction techniques and materials may be utilized. Accordingly, other embodiments are within the scope of the following claims.

What is claimed is:

1. A self-lubricating bearing assembly of a hinge assembly of a turbine engine nozzle assembly, said hinge assembly having a bolt and a bell crank housing, said self-lubricating bearing assembly comprising:

a sleeve having a tubular portion and a shoulder portion;

a plurality of bushings, each having an inner diameter and an outer diameter;

a plurality of first liners, one of said plurality of first liners being affixed to said inner diameter of a respective one of said plurality of bushings;

a second liner disposed between a surface of said shoulder portion of said sleeve and one of said plurality of bushings;

said plurality of bushings being disposed about said sleeve such that said plurality of first liners contact said tubular portion;

a thrust washer;

a third liner disposed between a surface of said thrust washer and another one of said plurality of bushings, said third liner being affixed to said surface of said thrust washer;

a nut; and wherein said tubular portion of said sleeve is disposed over an outer diameter of said bolt, said outer diameters of said plurality of bushings being disposed within an inner diameter of said bell crank housing, and said thrust washer being affixed between said nut and said sleeve to secure said hinge assembly.

2. The self-lubricating bearing assembly of claim 1, wherein said first liners, said second liner and said third liner are comprised of a woven fluorocarbon-based polymer fabric material.

3. The self-lubricating bearing assembly of claim 2, wherein said woven fluorocarbon-based polymer fabric material is a PolyTetraFluoroEthylene (PTFE) fabric material.

4. The self-lubricating bearing assembly of claim 1, wherein said first liners are bonded to said inner diameter of one of said respective bushings.

5. The self-lubricating bearing assembly of claim 1, wherein at least one of said outer diameters of said bushings includes a recess therein, and wherein said bearing assembly further includes an o-ring disposed in said recess.

6. A self-lubricating bearing assembly of a hinge assembly, said hinge assembly having a bolt and a bell crank housing, said self-lubricating bearing assembly comprising:

a sleeve having a tubular portion and a shoulder portion;

a pair of bushings, each bushing having an inner diameter and an outer diameter;

a pair of first liners, each of said pair of first liners being affixed to said inner diameter of a respective one of said pair of bushings;

said pair of bushings being disposed about said sleeve such that said pair of first liners contact said tubular portion;

a second liner disposed between a surface of said shoulder portion of said sleeve and one of said pair of bushings;

a thrust washer;

a third liner disposed between a surface of said thrust washer and the other one of said pair of bushings, said third liner being affixed to said surface of said thrust washer;

a nut for securing said bushings within an inside area defined by an inside diameter of said bell crank housing; and wherein said tubular portion of said sleeve is disposed over an outer diameter of said bolt, said outer diameters of each of said pair of bushings is disposed within said inside diameter of said bell crank housing, and said nut cooperates with said sleeve, said bolt and said washer to secure said bushings within said inside area.

7. The self-lubricating bearing assembly of claim 6, wherein said first liners, said second liner and said third liner are comprised of a woven fluorocarbon-based polymer fabric material.

* * * * *